April 16, 1929.　　　　　P. POSSIN　　　　　1,709,684
APPARATUS PROVIDING HEAT, LIGHT, AND RADIO SERVICE FOR AIRSHIPS
Filed May 23, 1928　　　2 Sheets-Sheet 1
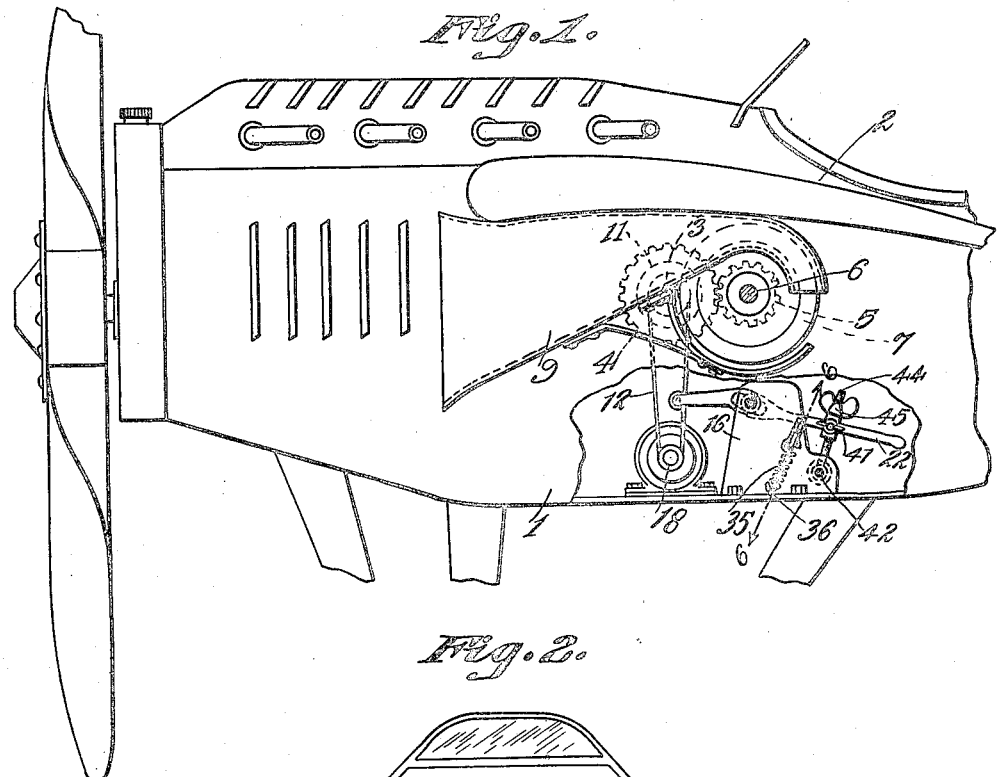
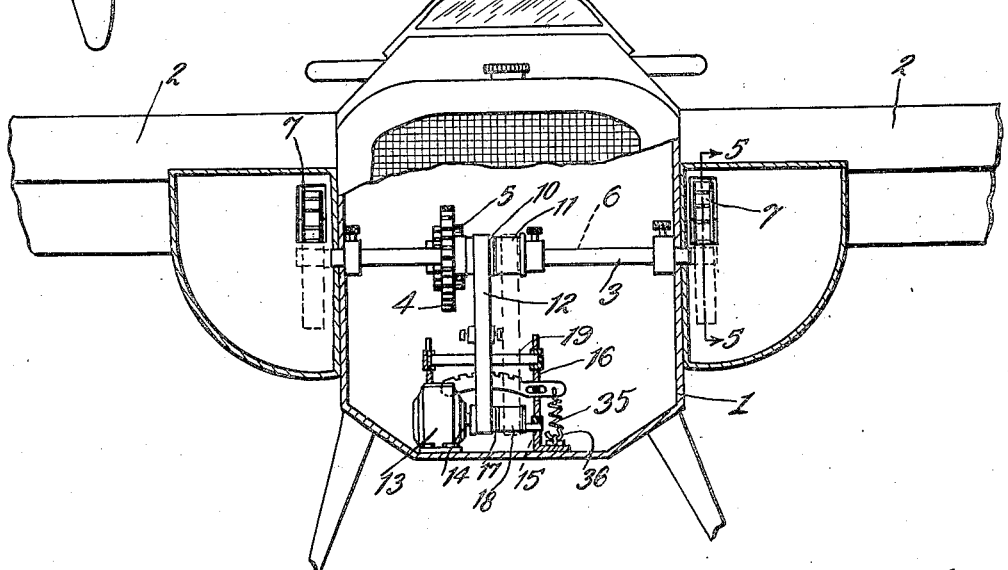
Paul Possin
INVENTOR
BY Victor J. Evans
ATTORNEY
WITNESS: John Winsel Patented Apr. 16, 1929.

1,709,684

UNITED STATES PATENT OFFICE.

PAUL POSSIN, OF PHILADELPHIA, PENNSYLVANIA.

APPARATUS PROVIDING HEAT, LIGHT, AND RADIO SERVICE FOR AIRSHIPS.

Application filed May 23, 1928. Serial No. 280,029.

The present invention relates to an improved apparatus to be carried on an airship and operated by air power employing overshot power wheels on both sides of the fuselage for the purpose of rotating a shaft having operative belt connections with a dynamo, which furnishes heat, light and radio service for the ship.

Another purpose of the invention is the provision of funnels on both sides of the fuselage to gather in the air as the ship travels, said funnels being contracted toward the over-shot power wheels, to concentrate the air on the upper parts of the blades of the power wheels, so as to rotate a driving shaft, which in turn is belted to the dynamo.

Another purpose is to provide means for tightening the belt and for shifting the belt from fast and loose pulleys on the driving shaft and on the shaft of the dynamo.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a side view of a portion of an airship, illustrating the forward part of the fuselage and illustrating the planes or wings in end view, and showing the improved apparatus applied.

Figure 2 is a front view of the airship showing the fuselage partly in section.

Figure 3:
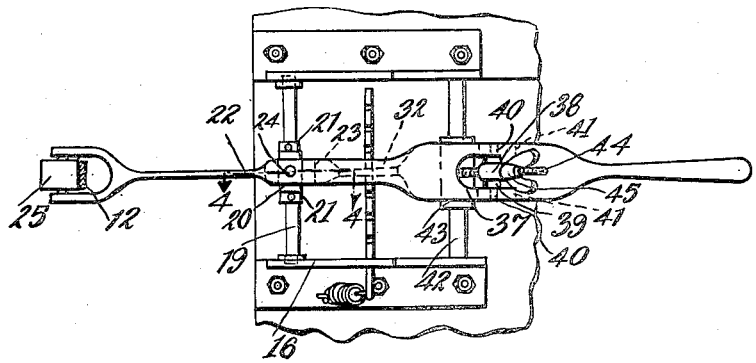
Figure 3 is a plan view of the belt shifting and tightening mechanism.
Figure 4:
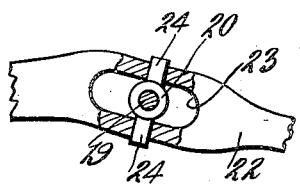
Figure 4 is a sectional view on line 4—4 of Figure 3.
Figure 5:
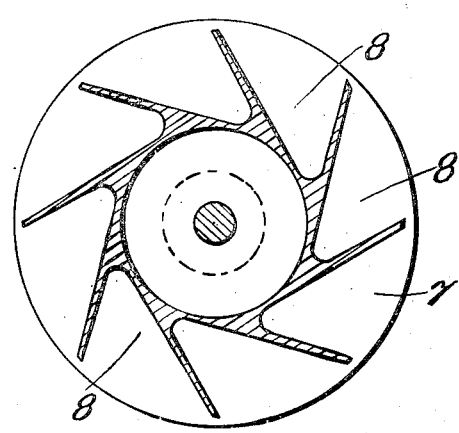
Figure 5 is a sectional view on line 5—5 of Figure 2, showing the air power wheel in section.
Figure 6:
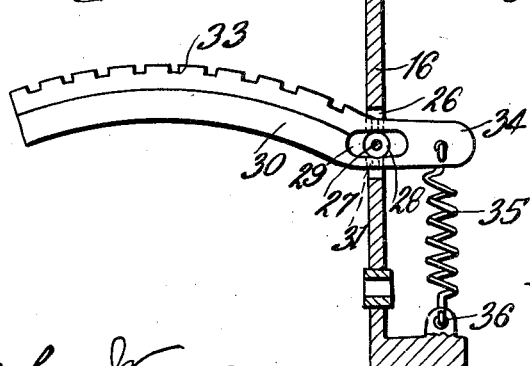
Figure 6 is an enlarged detailed view on line 6—6 of Figure 1.

Referring to the drawings, 1 identifies the fuselage of an airship, which may be any size and shape, preferably of the standard proportions and 2 are the wings or planes, and mounted in bearings transversely of the fuselage is a shaft 3. This shaft carries a drive gear 4, which meshes with another gear wheel 5 on a shaft 6, the ends of which are mounted in bearings of the sides of the fuselage. This shaft 6 carries on opposite ends air power wheels 7 which have cavities or cups 8 into which the air as the ship travels is gathered in order to impart movement to the wheels.

Also mounted on the sides of the fuselage in any conventional manner are funnels 9. The air power wheels operate through the smaller ends of the funnels, which are tapered as shown to direct and confine the air toward the cups or pockets of the air wheels. The air wheels may be any size, and certain walls of the pockets or cups are tangent to the hub or body of the wheel in order to properly pocket the air in such wise as to obtain the greatest amount of power possible.

Also carried by the shaft 3 are fast and loose pulleys 10 and 11, and engaged with the fast pulleys as in Figure 2 is a belt 12, which may be shifted to the loose pulleys 11, for the purpose of allowing a dynamo 13 to remain idle.

The dynamo 13 may be any suitable construction, any size, and its shaft 14 is mounted in a bearing 15 of a frame 16. The dynamo shaft 14 carries fast and loose pulleys 17 and 18. When the belt 12 is shifted to the loose pulley 11 it is also shifted to the loose pulley 18.

Mounted in the frame 16 is a shaft 19, on which a sleeve 20 is mounted. Axial movement of the sleeve 20 is prevented by collars 21.

A lever 22 is provided, and is slotted at 23 to receive the sleeve 20. The sleeve 20 is provided with diametrically opposite radial pins or lugs 24 which are journaled in bearings of the walls of the slot 23, and by this construction and arrangement of the sleeve and the lugs 24 the lever 22 is capable of oscillatory movement laterally and vertically. By means of the lateral movement of the lever 22 it is possible to shift the belt 12 from the fast pulleys to the loose pulleys and by means of a vertical movement it is possible to tighten the belt when engaged with the fast pulleys. In order to shift the belt 12 one end of the lever is forked, and mounted between the forks is a roller 25, which engages with the belt 12 for the purpose of tightening the same, while the forks bear upon the edges of the belt to insure shifting of the belt.

One side of the frame 16 has an opening 26, transversely of which a rod 27 is arranged. A sleeve 28 is mounted upon the rod 27 and is positioned within a slot 29 of a rack 30, there being lugs or pins 31 engaged with the walls of the slot 29, whereby the rack may have vertical movements, as well as slight lateral movements.

The lever 22 substantially mid-way of its ends on its lower face for a short distance is narrowed at 32 for the purpose of engaging with the teeth 33 of the rack 30. One end 34 of the rack 33 is extended beyond one side of the frame 16, and connected to the extended end is a coil spring 35, which in turn is connected to an eye 36 on the floor of the fuselage. By means of the spring 35 the rack 33 is at all times retained in engagement with the narrowed portion 32 of the lever 22.

The lever 22 has an opening or slot 37, in which a sleeve 38 is mounted. The sides of the sleeve have bosses 39, which closely engage the opposite walls of the opening 37. The bosses 39 are large enough to prevent twisting of the sleeve, and projecting axially from the bosses are lugs 40, which engage slots 41 of the sides of the lever, thereby allowing the lever to have pivotal movement relative to the sleeve 38, as well as permitting the sleeve to slide in the slot 37.

Journaled in opposite sides of the frame 16 is a shaft 42, on which a sleeve 43 is slidable. This sleeve 43 is loose on the shaft 42 so it will not bind when it is shifting, and projecting radially from the sleeve 43 is a threaded rod 44, which passes through but not threaded in the sleeve 38, but threaded on the rod 44 is a wing nut 45. By turning up on the wing nut it is possible to tilt the lever 22 vertically causing the roller 25 to engage with and tighten the belt 12. By backing the wing nut with relation to the rod 44 it is possible to move the lever 22 and thereby relieving close engagement of the roller 25 with the belt. When the lever is moved vertically, the lever has a pivotal connection with the lugs 40. When the wing nut is backed up on the rod 44, the spring 25 not only retains the rack 30 in engagement with the lever at 32 but tends to relieve close engagement of the roller 25 with the belt.

However when it is desired to shift the belt 12, the lever 22 may be moved pivotally on the lugs 24, and in this case the rack 30 is tilted downwardly from engagement with the lever, and then allowed to return to engagement to hold the lever shifted. It necessitates a lateral movement of the lever 22 to shift the belt 12 from the fast pulley to the loose pulley and vice versa. By any suitable means it is possible to conduct current from the dynamo for the purpose of furnishing heat to a heater within the fuselage or current to a lighting system or for radio service. However none of these devices are disclosed, excepting to say that the dynamo is used for such a purpose.

The invention having been set forth, what is claimed is:—

1. The combination with a fuselage of an airship, of a driving shaft journaled in bearings of the fuselage provided with air propelled wheels on both ends adjacent the sides of the fuselage, of means for confining the air and directing it to the wheels over-shot thereto, a driven shaft geared to the driving shaft, a dynamo mounted within the fuselage and having fast and loose pulley and belt connections with the driven shaft.

2. The combination with a fuselage of an airship, of a driving shaft journaled in bearings of the fuselage provided with air propelled wheels on both ends adjacent the sides of the fuselage, of means for confining the air and directing it to the wheels over-shot thereto, a driven shaft beared to the driving shaft, a dynamo mounted within the fuselage and having fast and loose pulley and belt connections with the driven shaft, and means for shifting and tightening the belt.

3. The combination with a fuselage of an airship having wings, of funnels secured to opposite sides of the fuselage with their larger ends facing forward and fitting immediately under the wings and in the corners where the wings project from the fuselage, a driving shaft in bearings of the fuselage provided with over-shot air power wheels operatively associated with the smaller ends of the funnels, whereby the air passing through the funnels may impinge with the pockets of the wheels for driving the shaft, a driven shaft operatively connecting with the driving shaft, and a dynamo operatively associated with the driven shaft, said operative connections between the dynamo and the driven shaft comprising fast and loose pulleys, and means for shifting the belt from the fast pulleys to the loose pulleys and vice versa.

In testimony whereof he affixed his signature.

PAUL POSSIN.